Feb. 20, 1962 J. A. LOWRY 3,021,957
CONVEYING APPARATUS
Filed July 28, 1958 3 Sheets-Sheet 1

INVENTOR;
JOHN A. LOWRY,
BY David Young
ATT'Y.

Feb. 20, 1962  J. A. LOWRY  3,021,957
CONVEYING APPARATUS
Filed July 28, 1958  3 Sheets-Sheet 3

INVENTOR;
JOHN A. LOWRY,
BY David Young
ATT'Y.

United States Patent Office 3,021,957
Patented Feb. 20, 1962

3,021,957
CONVEYING APPARATUS
John A. Lowry, Columbus, Ohio, assignor to The Jeffrey Manufacturing Company, a corporation of Ohio
Filed July 28, 1958, Ser. No. 751,253
2 Claims. (Cl. 210—526)

The instant invention relates to a conveying apparatus comprising a conveyor adapted to be immersed in a tank for collecting a sink product which is washed into the tank and settles therein.

It is the prime object of the instant invention to provide an improved conveying apparatus for collecting a sink product in a tank into which the product is washed.

It is a further object of the instant invention to provide an improved conveying apparatus comprising a conveyor adapted to be operated in a tank for collecting a sink product which is washed into the tank, in which the conveyor can be raised out of the tank and removed therefrom.

It is another object of the instant invention to provide an improved conveying apparatus comprising a conveyor, in which the weight of the conveyor maintains it in operating position.

Other objects of the invention will appear hereinafter, the novel features and combinations being set forth in the appended claims.

Figure 1:
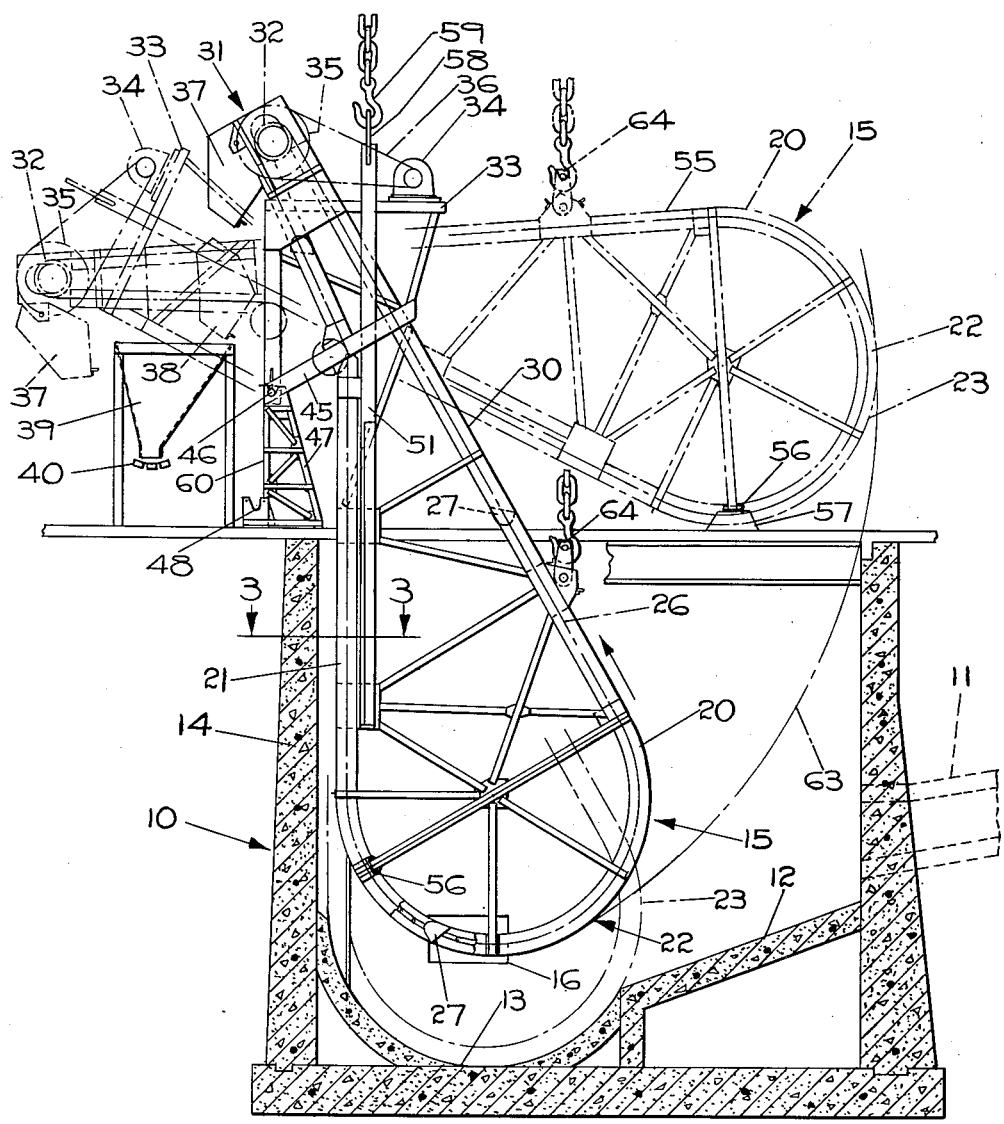
FIG. 1 is an elevational view, partially in section, of the improved conveying apparatus of this invention.
Figure 2:
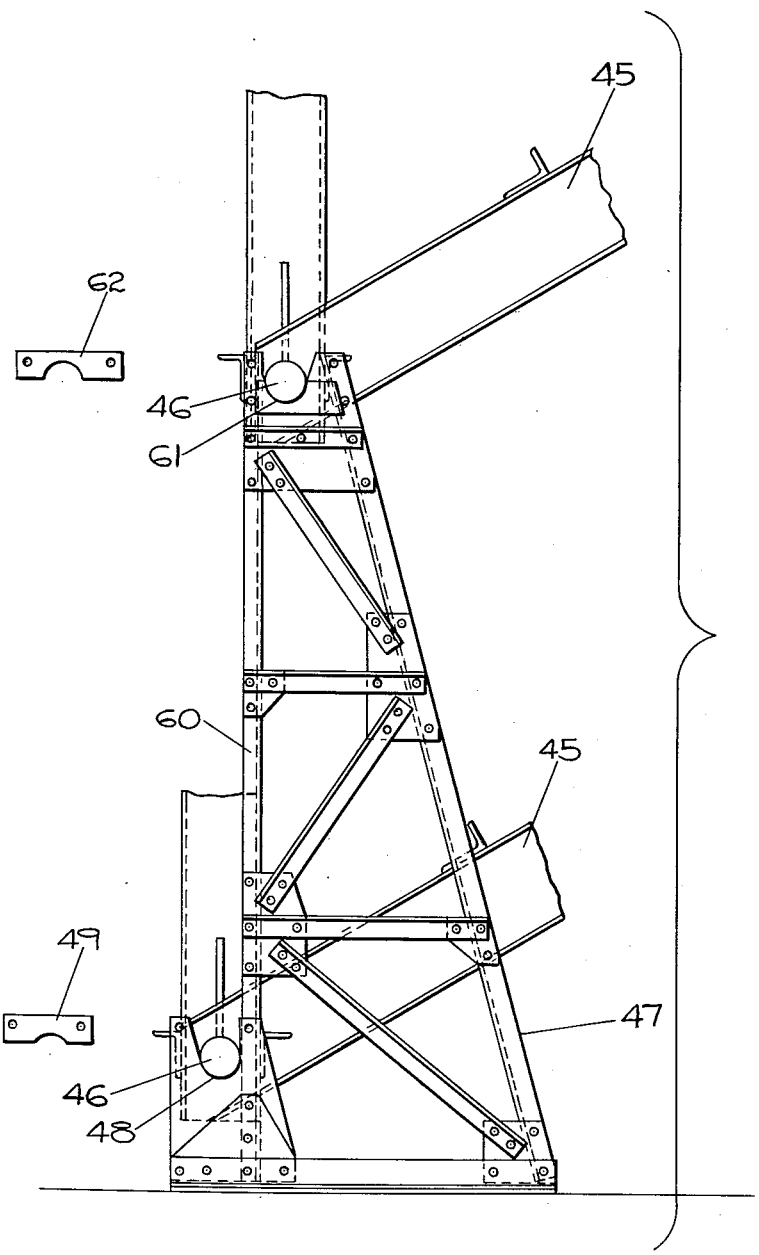
FIG. 2 is an exploded view showing the tower of the improved conveying apparatus of this invention.

Referring to the drawings, and particularly to FIG. 1, there is illustrated the improved conveying apparatus of this invention comprising a tank 10, which may be formed of concrete and into which there is delivered a sink product, which is washed into the tank 10 through a sluiceway 11 by a high velocity stream of liquid, which is usually water. The sink product entrained in the liquid flows over the incline 12 in the bottom of the tank 10 and into the sump 13, which is formed in the bottom of the tank and extends forwardly from the rear wall 14 of the tank 10. The sump 13 is formed with an arcuate section, preferably as part of the arc of a circle, for a purpose to be described hereinafter. The sink product being heavier than the liquid in which it is entrained as it is washed into the sump 13, settles out of the liquid in the sump 13, and is collected and removed therefrom by the conveyor 15. An overflow 16 is provided in a wall of the tank 10 and serves as a discharge for the liquid flowing into the tank 10.

The conveyor 15 comprises a main frame 20, which is formed of fabricated steel, or like material. At each side of the main frame 20 there is provided an inwardly facing channel 21 extending around the main frame 20, and giving the main frame 20 the substantially teardrop configuration, as seen in FIG. 1. The conveyor 15 includes an enlarged foot section 22 at the bottom thereof which is adapted to be placed in the sump 13, the foot section 22 and the sump 13 having complementary shapes so that they fit together when the conveyor 15 is in operating position, as shown in broken lines 23 in FIG. 1.

Figure 3:
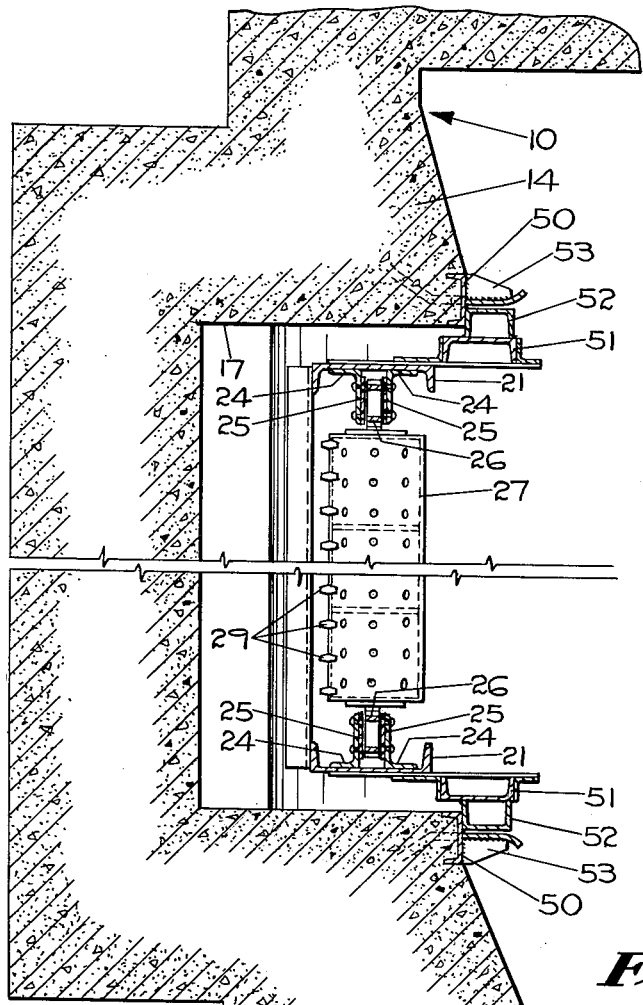
FIG. 3 is a sectional view of a portion of the conveying apparatus of this invention, taken on the line 3—3 in FIG. 1.
Figure 4:
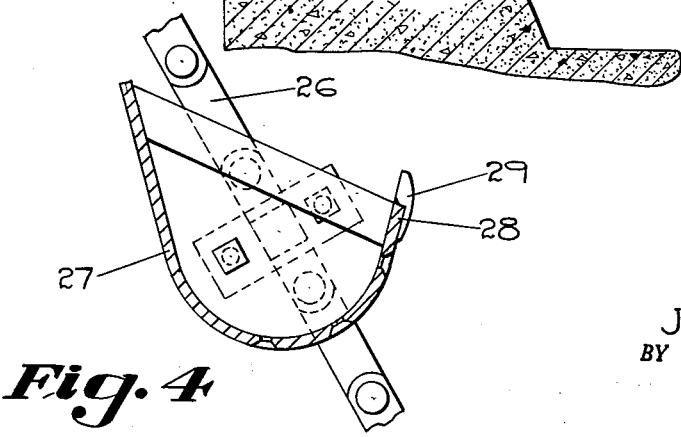
FIG. 4 is a sectional view of a conveyor bucket of the improved conveying apparatus of this invention.

A pair of angle members 24 is secured to the inside of each channel 21, as seen in FIG. 3. The angle members 24 are oppositely disposed within the channel 21, with a leg of each angle member 24 extending laterally inwardly from the channel 21. A wear plate 25 is secured to a leg of each angle member 24, with the wear plates 25 being spaced from each other and facing each other. The angle members 24 form a track on the inside of each channel 21 for an endless chain 26 which travels around the conveyor main frame 20, with the chain 26 bearing on the wear plates 25.

At each of a plurality of positions along the length of the chains 26 there is secured a bucket 27. The leading edge 28 of each bucket has secured thereto a plurality of teeth 29, which adapt the bucket to dig into the sink product, which settles out of the liquid in the sump 13, for removing the sink product from the sump 13. The endless chains 26 and the buckets 27, which are carried thereby, travel in a counterclockwise direction on the main frame 20 through the path which is outlined by the channel member 21. The chains 26 and the buckets 27 travel downwardly on the conveyor main frame 20 along the rear wall 14 of the tank, and through the sump 13, with the buckets 27 collecting the sink product in the sump 13, and then upwardly along the rearwardly inclined portion 30 of the conveyor main frame 20.

At the top of the conveyor main frame 20 there is formed a head section 31 which includes a head pulley 32 about which the chains 26 are trained, the head pulley 32 driving the chains 26. The head section 31 is formed with a laterally extending platform 33 on which there is mounted a driving motor 34, which is connected to a drive pulley 35 by suitable drive means 36 for driving the head pulley 32 and thereby driving the chains 26.

The buckets 27 carry the sink product up along the inclined portion 30 of the conveyor main frame 20, and discharge the product over the head pulley 32 into a chute 37. The chute 37 is shown in its discharging position by broken lines 38 located adjacent and above hopper 39 into which the chute 37 discharges the product. It is seen in FIG. 1 that the head section 31 of the conveyor 15 extends above and to the rear of the tower 47 for the discharge of the product to the hopper 39 which is disposed behind the tower 47. Below the hopper 39 there is provided a belt conveyor 40, which receives the product from the hopper 39 and removes the product for ultimate disposition.

The head section 31 of the conveyor main frame 20 comprises a beam structure 45 which extends rearwardly beyond the conveyor main frame 20. The beam structure 45 comprises a laterally extending pivot shaft 46 by which the conveyor 15 is supported. Above the rear wall 14 of the tank 10 there is a tower 47 formed of fabricated steel, or a like material. Adjacent the bottom of the tower there is a seat 48, which is adapted to receive the pivot shaft 46 and thereby support the conveyor 15 through the beam structure 45, with the conveyor 15 being disposed in operating position as shown at 23 in FIG. 1. A hold-down bar 49 is bolted to the tower 47 above the seat 48 to hold the pivot shaft 46 in position.

Referring to FIG. 3, the tank 10 is there shown in lateral section and it is seen that the rear wall 14 of the tank 10 includes an inwardly offset portion 17 within which the rear portion of the conveyor 15 is disposed. At each side of the offset portion 17 of the rear wall 14, there is embedded a channel, which form a pair of guide tracks 50 for the conveyor 15. Each guide track 50 forms a shoulder opening towards the conveyor main frame 20 for receiving the latter, as described in greater detail hereinafter. An inwardly facing channel 51 is secured to each side of the conveyor main frame 20, forming a reinforcing element on the conveyor main frame 20. A second smaller channel 52 is secured to each channel 51 projecting outwardly therefrom. The channels 52 form guide rails on the conveyor main frame 20, and set against the tracks 50 which are embedded in the rear wall 14 of the tank 10. The pivot shaft 46 pivotally supports the conveyor 15 on the seat 48. The major portion of the weight of the conveyor 15 is disposed forwardly of the pivot shaft 46, whereby the conveyor 15 tends to swing on the pivot shaft 46 in a clockwise direction, causing the rails 52 to bear laterally against the guide tracks 50, and thereby maintaining the conveyor 15 in operating generally upright position with the foot section 22 being disposed in the sump 13. At a plurality of positions along the guide tracks 50 there are provided centering shoes 53 which center the conveyor 15 in the tank 10.

In the course of operation of the conveyor 15 the various parts thereof are subject to wear and may require replacement. It may also be necessary to service the conveyor for other reasons during the life thereof. In order to facilitate servicing of the conveyor 15, it is possible to remove the conveyor 15 from the tank 10 and to place it in a substantially horizontal position 55, as seen in FIG. 1. Each side of the conveyor main frame 20 includes a laterally extending lug 56 below which there is placed a block 57 for maintaining the conveyor 15 in the horizontal position 55 for servicing.

At the top of the channels 51 there is provided an apertured plate 58 for the reception of a hook 59 of a crane, by means of which the entire conveyor 15 may be raised vertically out of the tank 10. In raising the conveyor 15, the pivot shaft 46 rides along the rear upright angle members 60 of the tower 47, and the weight distribution of the conveyor 15 during this elevating operation is such that the rails 52 continue to bear against the guide tracks 50 thereby guiding the conveyor 15 as it is raised. The conveyor 15 is raised to a position in which the pivot shaft 46 is located slightly above the top of the tower 47, and then is moved forwardly until the pivot shaft 46 is disposed above the seat 61. The conveyor 15 is then lowered, placing the pivot shaft 46 in the seat 61, whereby the conveyor 15 is pivotally supported on the top of the tower 47. The hold-down bars 62 are bolted to the tower 47, overlying the pivot shaft 46, to secure the latter in the seat 61. The crane hook 59 is disengaged from the plate 58 and is engaged with the pivoted bail 64, by which the conveyor 15 is swung upwardly in the arc 63 to dispose the conveyor 15 above the tank 10. The blocks 57 are then placed under the laterally extending lugs 56, thereby supporting the conveyor 15 in the substantially horizontal position 55, and permitting the crane to be used for other work.

The opposite procedure is followed in restoring the conveyor 15 to its operating position within the tank 10. In a continuous operation the sink product may continue to be washed into the tank 10 during the time that the conveyor 15 is removed from the tank. Thus there will be a greater than normal accumulation of the sink product in the sump 13, which will prevent the conveyor 15 from completely returning to its operating position in the sump 13 when it is lowered into the tank 10. In this condition the rails 52 on the conveyor main frame 20 bear against the tracks 50 serving to guide the conveyor main frame 20. The buckets 27, which are driven by the chain 26 through the accumulated sink product in the sump 13, will collect the sink product from the sump 13, and the conveyor 15 will thereby dig its way down into the sump 13 as the sink product is removed therefrom. The pivot shaft 46, through which the conveyor main frame 20 is supported, will finally seat itself on the seat 48 when the foot section 22 of the conveyor main frame 20 reaches the bottom of the sump 13.

The improved conveying apparatus of this invention has been employed for the collection of mill scale in steel mills. This mill scale is a product of a continuous scarfer which burns the scale from hot billets. In this application of this invention a high velocity stream of water is used to flush the scale into the tank and the scale, being relatively heavier than the water, settles out of the water into the bottom of the tank, from which it is collected and removed by the conveyor apparatus of this invention, and is ultimately returned to a sintering plant or to an ore pile for re-use in a blast furnace. In accordance with this invention the conveyor can be readily and quickly removed from the tank for replacement of any parts that may become worn, and for other service that may be necessary. In the described application of the invention, the improved conveying apparatus is a continuously operating piece of equipment which is an essential element of the steel mill, and therefore it is of paramount importance that it can be quickly and conveniently taken out of service, and that with equal facility it can be restored to service, so as not to unduly interfere with the operation of the steel mill.

Obviously those skilled in the art may make various changes in the details and arrangement of parts without departing from the spirit and scope of the invention as defined by the claims hereto appended, and applicant therefore wishes not to be restricted to the precise construction herein disclosed.

Having thus described and shown an embodiment of the invention, what it is desired to secure by Letters Patent of the United States is:

1. A conveying apparatus for collecting a sink product in a tank in which the sink product is washed into the tank by a stream of liquid, a conveyor main frame adapted to be disposed in the tank, a conveyor on the main frame adapted to travel through the tank for collecting the product, means on the main frame for guiding the conveyor through the tank, said tank including an upright guide track facing the conveyor main frame and forming a shoulder opening towards the conveyor main frame, said conveyor main frame including an upright rail cooperating with the guide track to position the conveyor main frame in the tank in a generally upright position, said conveyor main frame including a beam structure having a pivot thereon, a tower including a seat adjacent the base thereof for the pivot of the beam structure to support the conveyor main frame in the tank, a second seat at the top of the tower for receiving the pivot of the beam structure when the conveyor main frame is raised out of the tank to support the conveyor main frame in elevated position and provide for swinging of said conveyor main frame from a generally upright position to a generally horizontal position outside said tank, and said rail being in engagement with the guide track when the conveyor main frame is raised out of the tank to guide the conveyor main frame.

2. A conveying apparatus for collecting a sink product in a tank in which the sink product is washed into the tank by a stream of liquid, a conveyor main frame adapted to be disposed in the tank, a conveyor on the main frame adapted to travel through the tank for collecting the product, means on the main frame for guiding the conveyor through the tank, said tank including an upright guide track facing the conveyor main frame and forming a shoulder opening towards the conveyor main frame, said conveyor main frame including an upright rail bearing laterally against the guide track to position the conveyor main frame in the tank, said conveyor main frame including a beam structure having a pivot shaft, a tower including a seat adjacent the base thereof for receiving said shaft to support the conveyor main frame in the tank, a second seat at the top of the tower for receiving said shaft when the conveyor main frame is raised out of the tank and supporting the conveyor main frame in elevated position, said second seat being adapted to pivotally seat the shaft for pivotally supporting the conveyor main frame and permitting the conveyor main frame to be swung to a position in which it is disposed above the tank, and said rail being in engagement with the guide track when the conveyor main frame is raised out of the tank to guide the conveyor main frame.

References Cited in the file of this patent

UNITED STATES PATENTS

| | | | |
|---|---|---|---|
| 876,713 | Harden | Jan. 14, | 1908 |
| 918,054 | Jackson | Apr. 13, | 1909 |
| 1,191,115 | Reynolds | July 11, | 1916 |
| 1,432,917 | Shaw | Oct. 24, | 1922 |
| 1,435,770 | Welser | Nov. 14, | 1922 |
| 1,559,535 | Roddy et al. | Oct. 27, | 1925 |
| 1,874,736 | Bleyer | Aug. 30, | 1932 |
| 1,920,158 | Albertson | July 25, | 1933 |
| 2,102,570 | Lind | Dec. 14, | 1937 |
| 2,532,457 | Morgan | Dec. 5, | 1950 |
| 2,768,730 | Brakhage | Oct. 30, | 1956 |